United States Patent
Zhang et al.

(10) Patent No.: US 12,066,157 B2
(45) Date of Patent: Aug. 20, 2024

(54) LIGHT-EMITTING ASSEMBLY, METHOD FOR ADJUSTING LIGHT-EMITTING ASSEMBLY, AND VEHICLE

(71) Applicant: VALEO VISION, Bobigny (FR)

(72) Inventors: Xin Zhang, Wuhan (CN); Liang Lin, Wuhan (CN); Zhao Fang, Wuhan (CN); Lihua Zeng, Wuhan (CN); Jianmin Yuan, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/996,406

(22) PCT Filed: Apr. 16, 2021

(86) PCT No.: PCT/CN2021/087634
§ 371 (c)(1),
(2) Date: Oct. 17, 2022

(87) PCT Pub. No.: WO2021/209021
PCT Pub. Date: Oct. 21, 2021

(65) Prior Publication Data
US 2023/0213159 A1 Jul. 6, 2023

(30) Foreign Application Priority Data

Apr. 17, 2020 (CN) .......................... 202010298480.X
Apr. 17, 2020 (CN) .......................... 202020583124.8

(51) Int. Cl.
*F21S 41/19* (2018.01)

(52) U.S. Cl.
CPC .................................. *F21S 41/192* (2018.01)

(58) Field of Classification Search
CPC ......... F21S 41/192; B60Q 1/04; B60Q 1/045; B60Q 1/076; B60Q 1/068; B60Q 1/06
See application file for complete search history.

(56) References Cited

U.S. PATENT DOCUMENTS 6,773,152 B2   8/2004 Ruckwied
2020/0164789 A1* 5/2020 Tajima ................ B60Q 1/0683

FOREIGN PATENT DOCUMENTS

| CN | 103727478 A | 4/2014 |
| CN | 109386810 A | 2/2019 |
| CN | 209605073 U | 11/2019 |

(Continued)

OTHER PUBLICATIONS

Innovation Q+ NPL Search (Year: 2023).*
International Search Report issued Jul. 15, 2021 in PCT/CN2021/087634 filed on Apr. 16, 2021, 3 pages.

*Primary Examiner* — Anabel Ton
(74) *Attorney, Agent, or Firm* — Oblon, McClelland, Maier & Neustadt, L.L.P.

(57) ABSTRACT

A light-emitting assembly, a method for adjusting the light-emitting assembly, and a vehicle. The light-emitting assembly is used for a vehicle and includes a seat and a support, a light-emitting module being held on the support. A first adjustment mechanism is provided for performing a first adjustment on the light-emitting module, and a second adjustment mechanism is provided for performing a second adjustment on the light-emitting module. The support and the seat are pivotally connected together, so that the support can pivot around a horizontal axis under the action of the first adjustment mechanism.

20 Claims, 7 Drawing Sheets

(56) References Cited

FOREIGN PATENT DOCUMENTS

| CN | 110805875 A | 2/2020 | | |
|---|---|---|---|---|
| CN | 212005545 U | 11/2020 | | |
| EP | 2865567 A1 | * 4/2015 | ........... | B60Q 1/0483 |
| WO | WO-2016203945 A1 | * 12/2016 | ........... | B60Q 1/0683 |

* cited by examiner

LIGHT-EMITTING ASSEMBLY, METHOD FOR ADJUSTING LIGHT-EMITTING ASSEMBLY, AND VEHICLE

TECHNICAL FIELD

The present invention relates to a light-emitting assembly, a method for adjusting a light-emitting assembly and a vehicle having the light-emitting assembly.

BACKGROUND ART

A light-emitting assembly is an important part of a vehicle, providing lighting and/or signaling functions. Especially for light-emitting assemblies with lighting functions, for example, the low beam function and the high beam function, the adjustability should be ensured so that the light distribution meets regulatory requirements. However, such light-emitting assemblies are usually relatively heavy. When the light-emitting module forming the core of a light-emitting assembly is too heavy, it is possible that the connection between the light-emitting module and the adjustment mechanism becomes loose over time, or that the light-emitting module even disengages from the adjustment mechanism.

SUMMARY

Therefore, the purpose of the present invention is to provide a light-emitting assembly that can at least partially overcome the above disadvantage.

According to the present invention, an optical assembly is provided, the light-emitting assembly is used in a vehicle and has: a seat, a support on which a light-emitting module is held, a first adjustment mechanism to perform a first adjustment of the light-emitting module, and a second adjustment mechanism to perform a second adjustment of the light-emitting module, wherein the support is pivotally connected to the seat so that the support can pivot about a horizontal axis under the action of the first adjustment mechanism.

A "pivot" may be understood as a type of cylindrical pair, i.e., a rotational connection about a fixed axis, wherein one of the two members forming the "pivot" has a pivot (i.e., a short shaft) that can rotate, and the other member has a recess for accommodating the pivot, so that the first member can rotate about an axis defined by the pivot or the recess.

"Horizontal" may correspond to the lateral direction of the vehicle on which the optical assembly is mounted. Thus, the pivot axis is perpendicular to the direction of gravity.

Through the above design scheme, a first adjustment can be performed, i.e., rotating the light-emitting module about a horizontal axis for pitch adjustment, while a lasting and stable connection of the light-emitting module is ensured at the same time. Specifically, the weight of the light-emitting module can be at least mainly borne by the pivot part, thereby effectively reducing or even eliminating the load acting on the first adjustment mechanism, while ensuring a lasting and stable connection of the light-emitting module.

According to the embodiments of the present invention, the seat and the support are respectively provided with a first pivot shaft and an accommodating portion on one side, and a second pivot shaft and an accommodating portion on the opposite side, the first pivot shaft and the second pivot shaft are respectively accommodated in the accommodating portions, and the pivot axis corresponds to an axis of the first pivot shaft and the second pivot shaft or a central axis of the accommodating portions. By arranging a pair of opposite pivot structures, a more stable connection between the seat and the support can be ensured. In addition, the corresponding pivot shafts and the corresponding accommodating portions may be arranged on relevant members according to specific conditions, as long as they are co-linear.

According to the embodiments of the present invention, at least one accommodating portion is a slot open in the circumferential direction and is provided with a cover, wherein the inner contour of the accommodating portion and the cover matches the outer contour of the pivot shaft. This makes it easier to mount the support holding the light-emitting module onto the seat. For this, the cover is used to shut the slot after the support is seated on the seat. The cover may be attached to a fitting part in any suitable way, for example by screws.

According to the embodiments of the present invention, the light-emitting module comprises a first light-emitting module and a second light-emitting module, which are vertically stacked to realize one or more light functions.

According to the embodiments of the present invention, the second adjustment mechanism has points of action respectively acting on the first light-emitting module and the second light-emitting module, so as to perform the second adjustment about vertical axes separately. This makes it possible to adjust the associated light-emitting modules together by one adjustment mechanism.

According to the embodiments of the present invention, the second adjustment mechanism has a sliding block that can be guided linearly in the support, and the points of action are formed on the sliding block, wherein at least one point of action can be adjusted linearly. A point of action that can be adjusted linearly may be regarded as a fine-adjusting position, so that the point of action can be finely adjusted after the light-emitting assembly is assembled to maintain a desired orientation of an associated light-emitting module that needs to coordinate.

According to the embodiments of the present invention, the first light-emitting module and/or the second light-emitting module are/is provided with carriers via which the light-emitting module(s) is(are) held on the support, and the points of action act on the carriers. The carriers may be regarded as part of the light-emitting modules. In particular, a carrier may be separately formed, thereby simplifying the geometry of the housing of the light-emitting modules to lower the manufacturing costs.

According to the embodiments of the present invention, the first pivot shaft and the second pivot shaft are formed integrally with the support.

According to the embodiments of the present invention, the first pivot shaft and the second pivot shaft are formed separately from the support, wherein the first pivot shaft and the second pivot shaft are provided on the support as inserts.

According to the embodiments of the present invention, bearings are mounted on the first pivot shaft and the second pivot shaft.

According to the embodiments of the present invention, the first adjustment mechanism and/or the second adjustment mechanism are/is (a) manual and/or electric adjustment mechanism(s).

According to the embodiments of the present invention, the light-emitting module is a lighting module assembly.

According to the embodiments of the present invention, the first light-emitting module has a first light function, the second light-emitting module has a second light function, or the first light-emitting module and the second light-emitting module realize a light function in coordination.

According to the embodiments of the present invention, the seat is a housing of the light-emitting assembly or a component that is provided in the housing and fixed relative to the housing.

According to another aspect of the present invention, a method for adjusting a light-emitting assembly is also provided, and the light-emitting assembly is used in a vehicle and has: a seat, a support on which a light-emitting module is held, a first adjustment mechanism to perform a first adjustment of the light-emitting module, and a second adjustment mechanism to perform a second adjustment of the light-emitting module, wherein the first mechanism is adjusted so that the support pivots about a horizontal axis.

According to the embodiments of the present invention, the second adjustment mechanism is adjusted so that the support rotates about vertical axes.

According to another aspect of the present invention, a vehicle is also provided, which has the light-emitting assembly described above.

Through the solution proposed in the present invention, even when the light-emitting assembly is relatively heavy, a lasting and stable support for the light-emitting assembly can be achieved while the adjustability is ensured, and the manufacturing and installation costs of the light-emitting assembly can be minimized at the same time.

BRIEF DESCRIPTION OF THE FIGURES

The present invention is expounded in greater detail below with the aid of the drawings. In the drawings.

DETAILED DESCRIPTION OF THE EMBODIMENTS

Figure 1:
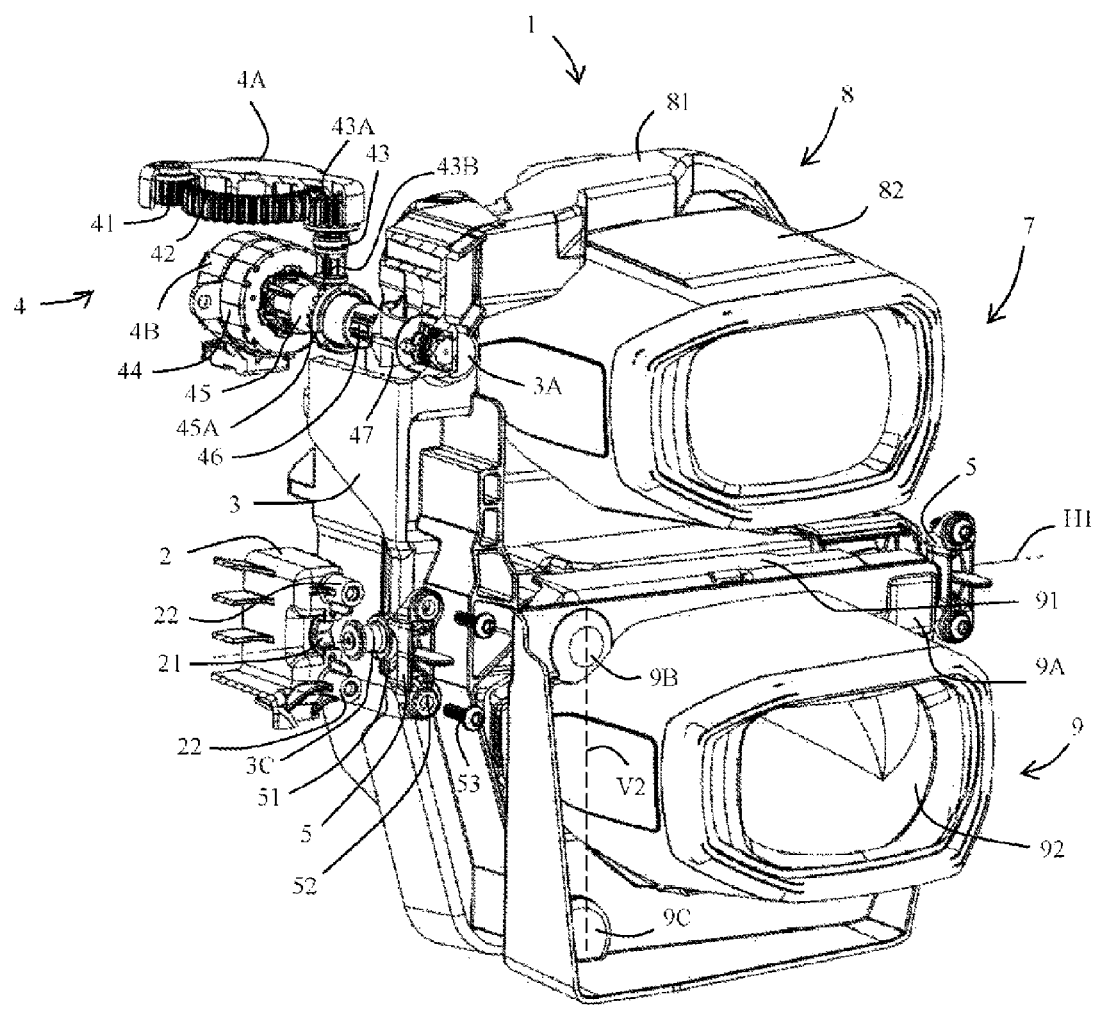
FIG. 1 is a schematic space view of the light-emitting assembly according to the present invention.

Embodiments of the present invention will be described demonstratively below. As those skilled in the art should realize, the embodiments described may be amended in various ways without departing from the concept of the present invention. Thus, the drawings and description are essentially illustrative, not restrictive. In the following text, identical reference numerals generally denote elements with identical or similar functions.

FIG. 1 schematically shows the light-emitting assembly 1 used for vehicles, in particular the lighting assembly, for example, the headlight assembly. Only the components of the light-emitting assembly 1 that are essential for describing the present invention are shown in the figure. That is, the light-emitting assembly 1 also has other components not shown in the figure.

The light-emitting assembly 1 has a seat 2. The seat 2 may be a component of the light-emitting assembly 1 that is fixed relative to its housing, or the housing of the light-emitting assembly 1. A "housing" refers to a component of the light-emitting assembly that is of a given shape and defines an internal accommodating space relative to the external environment. Only part of the seat 2 is shown schematically in FIG. 1.

The light-emitting assembly 1 further has a support 3, on which a light-emitting module 7 is held. The light-emitting module 7 is adjusted when necessary to meet regulatory requirements on light distribution. For this, the light-emitting assembly 1 also has a first adjustment mechanism 4 and a second adjustment mechanism 6 to adjust the light-emitting module 7 about a horizontal axis and a vertical axis respectively, which will be further described below.

In this example, the support 3 is pivotally connected to the seat 2, wherein the axis H1 of the pivot part extends horizontally. The first adjustment mechanism 4 acts on a first position 3A of the support 3. The first position 3A is not collinear with the horizontal axis H1, and they are offset from each other in the vertical direction. Thus, when an external force is applied to the first position 3A via the first adjustment mechanism 4, the support 3 can rotate about the horizontal axis H1, thereby driving the light-emitting module 7 held on the support to rotate about the horizontal axis.

Specifically, as can be seen from FIG. 1, the support 3 has a first pivot shaft 3B (not shown) and a second pivot shaft 3C disposed opposite to each other on its two sides in the horizontal direction, which are cylindrical and arranged coaxially. The seat 2 accordingly has accommodating portions 21 to accommodate the corresponding pivot shafts. For this, the pivot axis H1 corresponds to a central axis of the first pivot shaft 3B and the second pivot shaft 3C or a central axis of the accommodating portions 21.

For the accommodating portions 21 for accommodating the pivot shafts, at least one of the accommodating portions 21 is a slot open in the circumferential direction, for which a cover 5 is provided, wherein the inner contour 51 of the accommodating portion 21 and the cover 5 matches the outer contour of the pivot shaft, so that the support 3 cannot move transversely to the horizontal axis but can rotate about the horizontal axis. The cover 5 may be screwed to the seat 2 to close the slot. For this, the seat may have threaded holes 22 on both sides of the slot, and the cover 5 may have through holes 52 through which screws 53 are screwed into the threaded holes 22, thereby keeping the pivot shaft in position in the accommodating portion. The other of the accommodating portions may be a cylindrical hole closed in the circumferential direction, into which the pivot shaft can be introduced.

Alternatively, both accommodating portions are circumferentially open slots provided with covers, which are assembled afterwards. This facilitates cost-effective manufacturing and simplifies assembly compared to an accommodating portion that is closed in the circumferential direction.

Alternatively, in an example not shown, for the pivot part between the seat 2 and the support 3, when necessary, the pivot shaft is formed on the seat, and the accommodating portion is formed on the support; or the pivot shaft is formed on the seat and the accommodating portion is formed on the support on one side, while the pivot shaft is formed on the support and the accommodating portion is formed on the seat on the opposite side. In this way, under the action of an external force, the support can rotated relative to the seat.

The first adjustment mechanism 4 acting on the support may be a manual and/or electric hybrid adjustment mechanism. The first adjustment mechanism 4 has: a first adjusting unit 4A, which is a manual adjusting unit in the form of gear drive and has, for example, an input portion 41, an intermediate gear 42 and an output portion 43 that interact with each other and are constructed as gears, wherein the output portion 43 is a drive link with a first end 43A and a second end 43B, both being toothed portions; a second adjusting unit 4B, which is an electric adjusting unit and has a motor 44; a motion converting unit 45, which is coupled to the first adjusting unit and the second adjusting unit and can convert rotation into linear motion, so that an output rod 46 can translate along its axial direction. The motion converting unit 45 may have a gear ring on its periphery that meshes with the second end 43B of the output portion 43. A ball head 46A on the front end of the output rod 46 acts on the support via a joint 47. Thus, the axial translation of the output rod 46 can drive the support 3 to rotate about the horizontal axis H1. For this, the joint is held in the support at one end 47A, and holds the ball head 46A of the output rod 46 at the other end 47B, which has a vertical opening with a cross section matching the outer contour of the ball head, so as to ensure a connection without swinging and no interference with the rotation of the support 3 about the horizontal axis H1.

It can be seen from FIG. 1 that the light-emitting module 7 comprises a first light-emitting module 8 and a second light-emitting module 9, which are vertically stacked.

The first light-emitting module 8 may have a first function, for example the low beam function. The second light-emitting module 9 may have a second function, for example the high beam function. Or the first light-emitting module 8 and the second light-emitting module 9 may be combined to provide the high beam function. Of course, they may also have functions other than those described herein.

The first light-emitting module 8 and the second light-emitting module 9 may be held directly on the support 3 by, for example, establishing an adjustable connection with the support 3 through the housing of the corresponding light-emitting module. Alternatively, as partially shown in the figure, the first light-emitting module 8 and the second light-emitting module 9 have additional carriers 81 and 91, and an adjustable connection to the support 3 is established by means of the carriers, wherein the light-emitting units 82 and 92 of the light-emitting modules are fixedly connected to the carriers 81 and 91. For the latter, the use of a split structure is beneficial for simplifying the structure of the housing of the corresponding light-emitting module and reducing the manufacturing cost. The adjustment of the first light-emitting module 8 and the second light-emitting module 9 is realized by the second adjustment mechanism 6.

Figure 2:
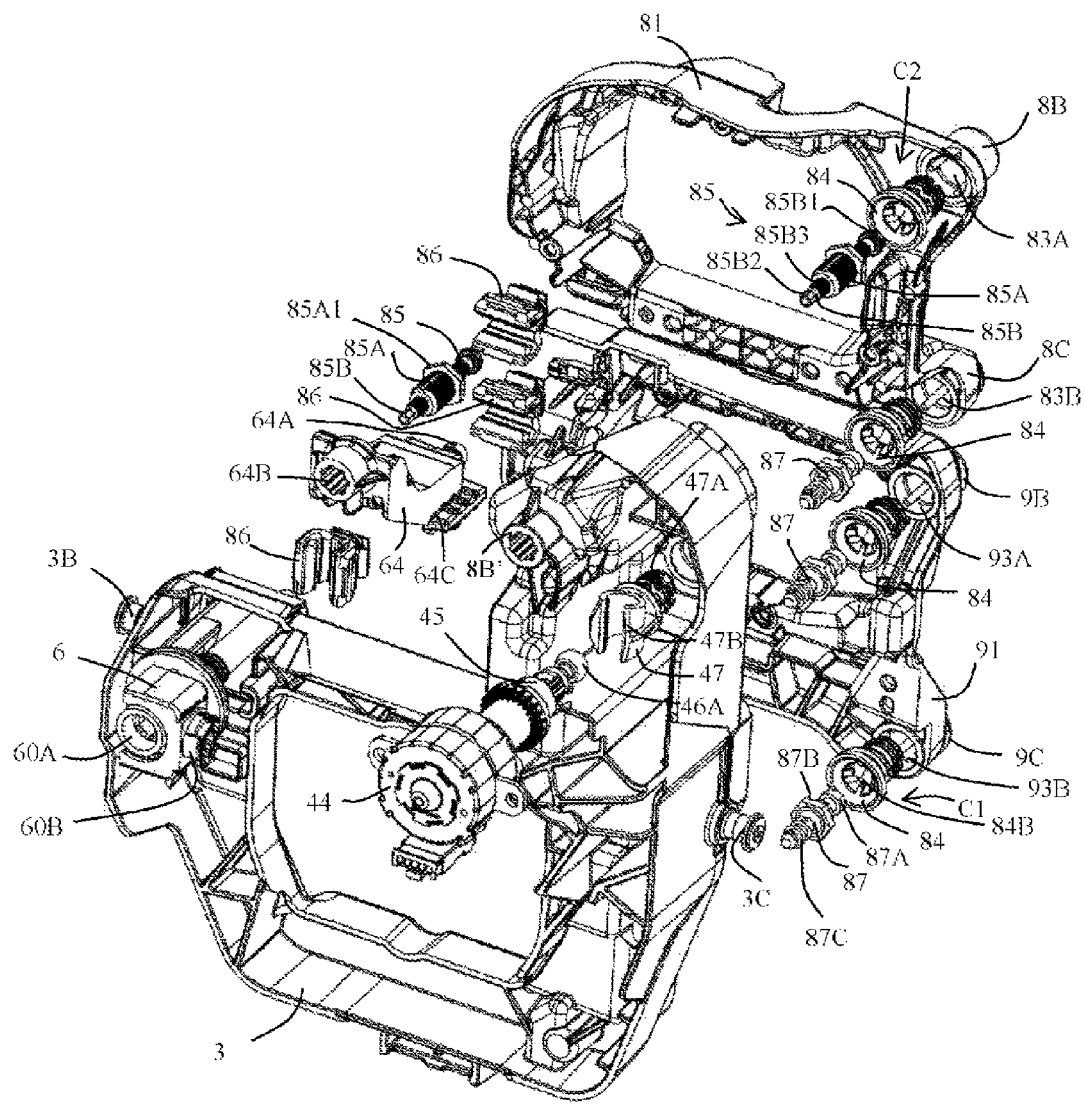
FIG. 2 is a schematic exploded view of light-emitting assembly in FIG. 1, wherein the light-emitting module is shown only in a simplified form.
Figure 3:
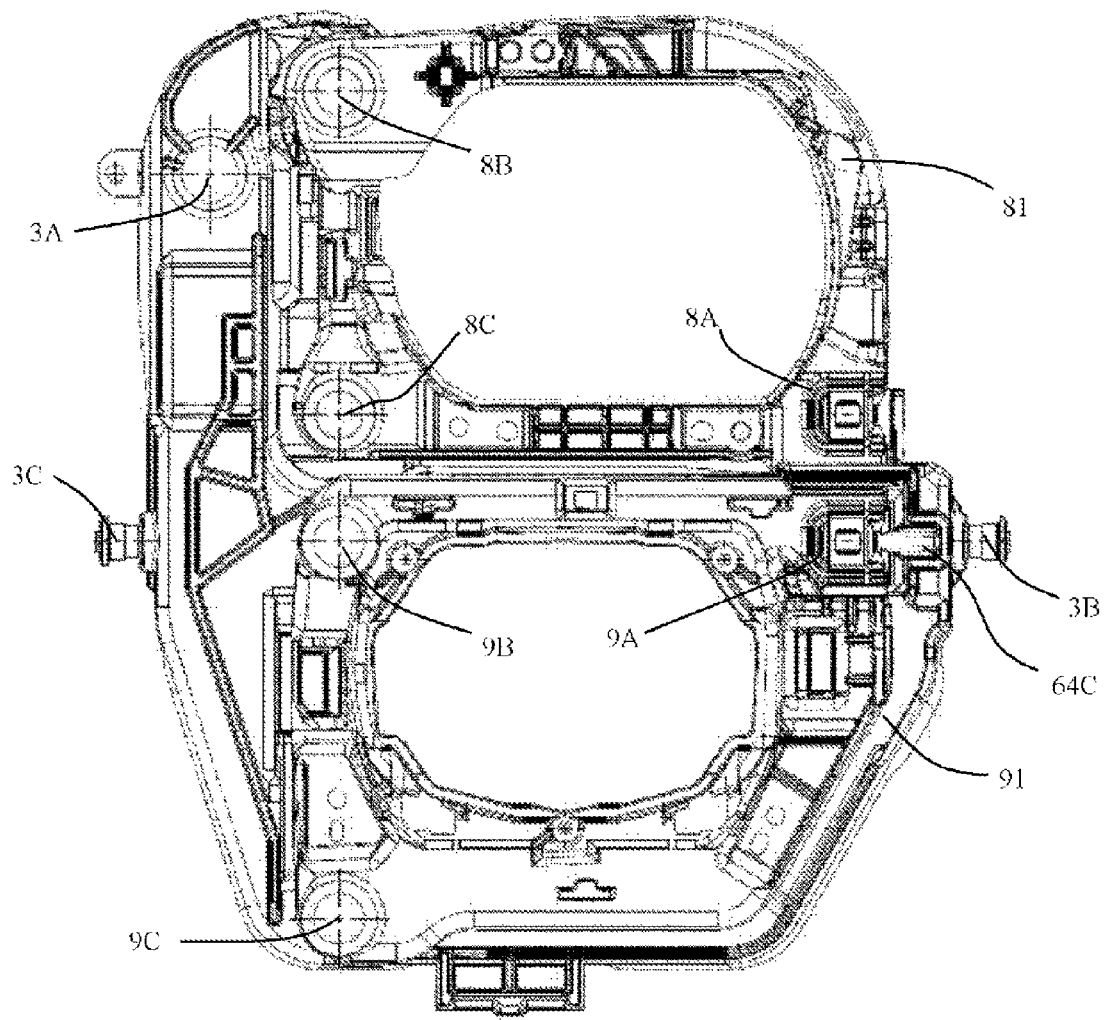
FIG. 3 is a schematic front view of the light-emitting assembly in FIG. 2.

A schematic exploded view of the light-emitting assembly 1 of FIG. 1 is shown in FIG. 2, wherein, to simplify the view, only the relevant carriers 81 and 91 are shown for the first light-emitting module 8 and the second light-emitting module 9 of the light-emitting module.

In order to connect the first light-emitting module 8 and the second light-emitting module 9 to the support 3, a first connecting unit C1 and a second connecting unit C2 are provided; the first connecting unit C1 has a socket 84 and a first ball head bolt 87, the second connecting unit C2 has a socket 84 and an adjusting unit 85, and the adjusting unit 85 comprises a threaded sleeve 85A and a second ball head bolt 85B. The first ball head bolt 87 is preferably integrally formed, wherein it has a ball head 87A at one end, a threaded portion 87C of a preset length at the opposite end, and an adjusting portion 87B between the two ends. The inner and outer walls of the threaded sleeve 85A of the adjusting unit 85 are provided with threads, and an adjusting portion 85A1 similar to the first ball head bolt 87 is also preferably integrally provided at one end. The second ball head bolt 85B of the adjusting unit 85 has a ball head 85B1 at one end, an adjusting section 85B2 at the opposite end, and an external thread section 85B3 between the two sections, and the external thread section is joined with the thread on the inner wall of the threaded sleeve 85A, as can be seen in FIG. 2. The socket 84 is joined at one end into the recesses 83A, 83B, 93A and 93B of the corresponding light-emitting module in such a manner that they cannot rotate relative to each other; the recesses 83A, 83B, 93A and 93B are formed at the corresponding points of action 8B, 8C, 9B and 9C of the light-emitting module; the socket 84 has a concave ball socket 84B at the other end, which is used to accommodate the ball head of the corresponding ball head bolt, so that the ball head bolt can swing relative to the socket 84 under the action of an external force, thereby forming a flexible ball connection. In addition, the first connecting unit C1 is screwed into the corresponding hole with internal thread of the support 3 via the threaded portion 87C of the first ball head bolt 87, and the second connecting unit C2 is screwed into the corresponding hole with internal thread of the support 3 via its threaded sleeve 85A, wherein the screw-in state can be adjusted via the adjusting portion, and in particular for the second connecting unit C2, the connection state can be further adjusted through the adjusting section 85B2. In other words, the second connecting unit C2 can perform further fine adjustment compared to the first connecting unit C1. The adjusting portions and adjusting sections described above have a cylindrical outer circumferential surface of a given length, in particular, for example, a hexagonal outer circumferential surface, so that they can be easily installed and adjusted by means of a wrench.

Figure 5:
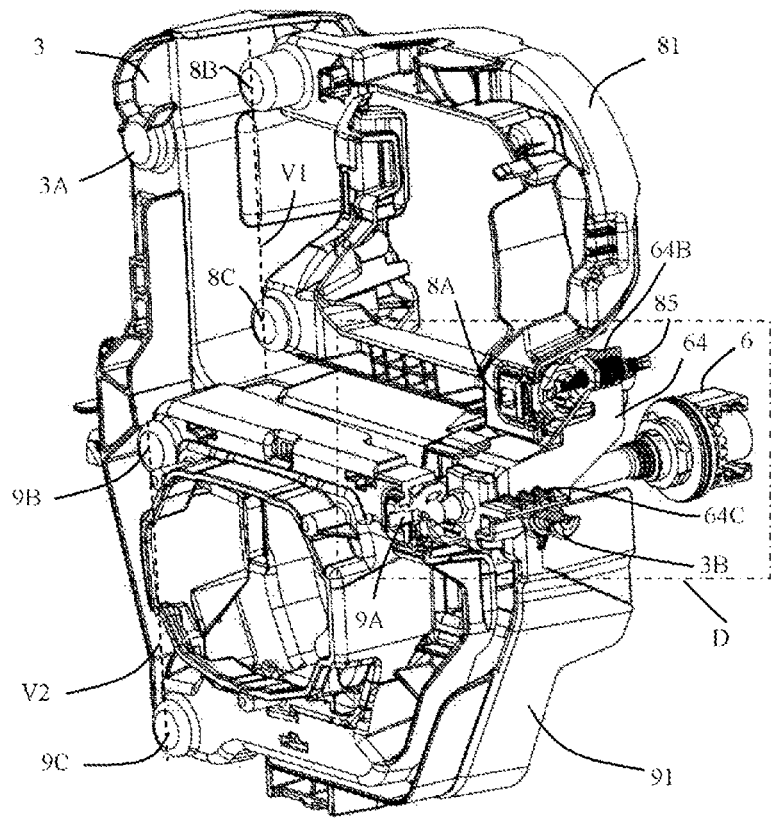
FIG. 5 is another schematic space view of the light-emitting assembly in FIG. 2.

As can be seen particularly clearly from FIG. 2, the first light-emitting module 8 is connected to the support 3 via vertically arranged spaced first and second connecting units C1 and C2; the second light-emitting module 9 is connected to the support 3 via two vertically arranged spaced first connecting units C1, thereby forming the corresponding vertical axes V1 and V2 (refer to FIG. 5). This will be further described below.

In order to realize the adjustment about the vertical axes, the first light-emitting module 8 and the second light-emitting module 9 are respectively provided with points of action 8A and 9A for the output portion of the second adjustment mechanism 6, which are spaced respectively relative to the action points 8B, 8C, 9B and 9C in the horizontal direction, so that when an applied external force is transmitted to the light-emitting modules 8 and 9 via the points of action 8A and 9A, the light-emitting modules can rotate about the vertical axes V1 and V2 to achieve left-right adjustment. In other words, the points of action 8A and 9A are drive points that swivel the relevant light-emitting modules from side to side, which are exemplified as openings to one side.

Figure 7:
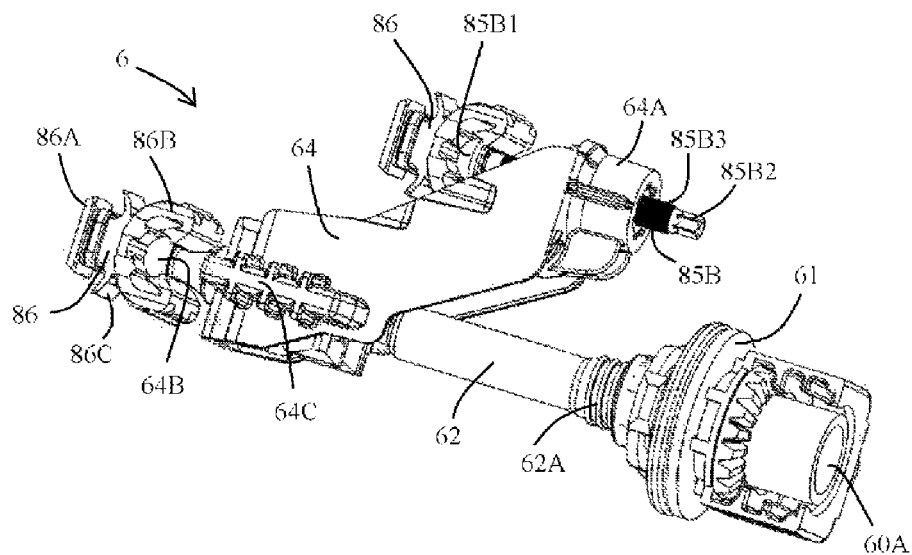
FIG. 7 is a schematic space view of the second adjustment mechanism used for the light-emitting assembly.
Figure 8:
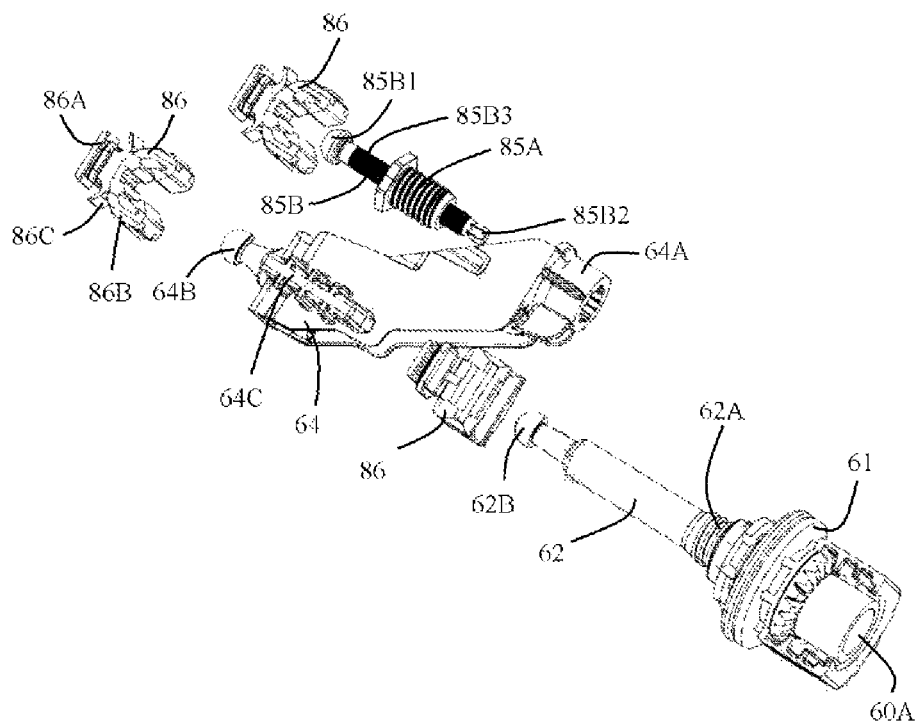
FIG. 8 is a schematic exploded view of the second adjustment mechanism in FIG. 7.

A schematic assembly diagram and a schematic exploded view of the second adjustment mechanism 6 are respectively given in FIG. 7 and FIG. 8.

Similar to the first adjustment mechanism 4, the second adjustment mechanism 6 is fixed relative to the housing of the light-emitting modules, and may be a manual and/or electric hybrid adjustment mechanism. For this, the second adjustment mechanism 6 may have a first interface 60A for manual adjustment and/or a second interface 60B for electric adjustment; a second motion converting unit 61, which converts the rotation introduced via the interface into linear movement; a driven rod 62 and slider 64. The driven rod is connected to the second motion converting unit 61 at one end 62A, and is connected to the slider 64 at the other end 62B, thereby transmitting the linear movement to the slider 64. The other end 62B of the driven rod 62 is preferably a ball head.

In the example shown, the slider 64 is connected to the driven rod 62 via a connecting piece 86. The flange 86A and the elastic piece 86C on one side of the connecting piece 86 together form a snap mount, which is snapped onto a protruding tab (not shown) formed on the slider 64 in a release-proofing manner. The connecting piece 86 has, on the other side, a retaining portion 86B for the ball-shaped end of the driven rod 62. The retaining portion 86B has a longitudinal extension, the cross section of which partially corresponds to the central cross section of the ball head, so that the ball head can swing within a certain range of angles relative to the retaining portion 86B. The ball-shaped end of the output rod 62 is accommodated in the retaining portion 86B in an anti-loosening manner. When the connecting piece 86 is installed at the slider, the longitudinal extension of the retaining portion of the connecting piece corresponds to the vertical axis, so as to prevent interference in the swinging of the support 3 about the horizontal axis when the first adjustment mechanism 4 acts.

The slider 64 is held on the support 3 in such a way that it can translate. For this, the slider 64 has a guide block 64C, and the support 3 has a corresponding guide groove 31. The numbers and positions of guide blocks 64C and the corresponding guide grooves 31 may be set as required, as long as the slider 64 can translate.

Preferably, the driven rod 62 is arranged to be as consistent as possible with the guiding direction of the slider 64 in the guide groove 31 to achieve maximum efficiency in force transmission.

The slider 64 has two driven portions 64A and 64B, i.e., the points of action, which act on the first light-emitting module 8 and the second light-emitting module 9 respectively. When the second adjustment mechanism 6 is adjusted, the corresponding adjustment movement is converted into a translational movement of the slider 64, thereby exerting a force on the light-emitting module, so that the light-emitting module can swing about the vertical axis to complete a left-right adjustment.

The first driven portion 64A may take the form of a hole with internal thread, is used for the first light-emitting module 8, and is equipped with the adjusting unit 85 comprising a threaded sleeve 85A and a second ball head bolt 85B as described above. The threaded sleeve 85A is mounted in the first driven portion 64A, and the ball head bolt 85B is in the threaded sleeve 85A.

The second driven portion 64B takes the form of a ball head, is used for the second light-emitting module 9, and is fixed relative to the body of the slider 64. Preferably, the second driven portion 64B is integrally formed with the body of the slider 64.

Therefore, the first driven portion 64A can be regarded as an adjustable driven portion, and the second driven portion 64B is a fixed driven portion.

Figure 6:
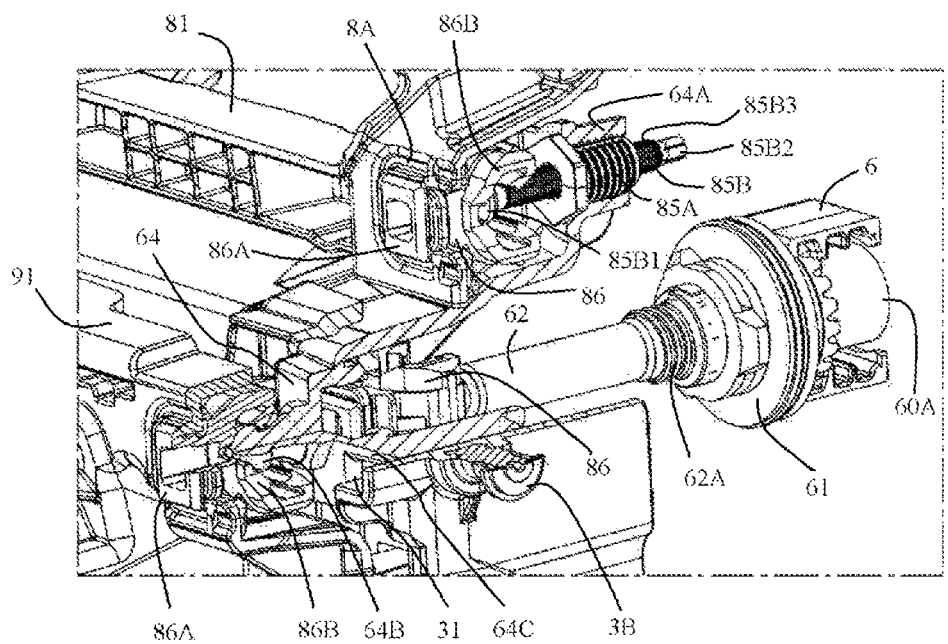
FIG. 6 is a partial enlarged view of region D of the light-emitting assembly in FIG. 5.

The two driven portions are respectively connected to the corresponding light-emitting modules via the connecting piece 86. The connecting piece 86 is connected to the light-emitting module on one side and to the associated ball head on the opposite side. For this, the connecting piece 86 is snapped onto the respective points of action 8A and 9A of the associated light-emitting modules 8 and 9 by means of its snap mount formed by the flange 86A and the elastic tab 86C, and holds the ball head used for the first driven portion 64A and the second driven portion 64B by means of its retaining portion 86B. Here, the longitudinal extension of the retaining portion 86B is parallel to the horizontal axis H1, so that the ball head can swing relative to the retaining portion when adjustment is performed through the second adjustment mechanism, as shown in FIG. 5 and FIG. 6.

Figure 4:
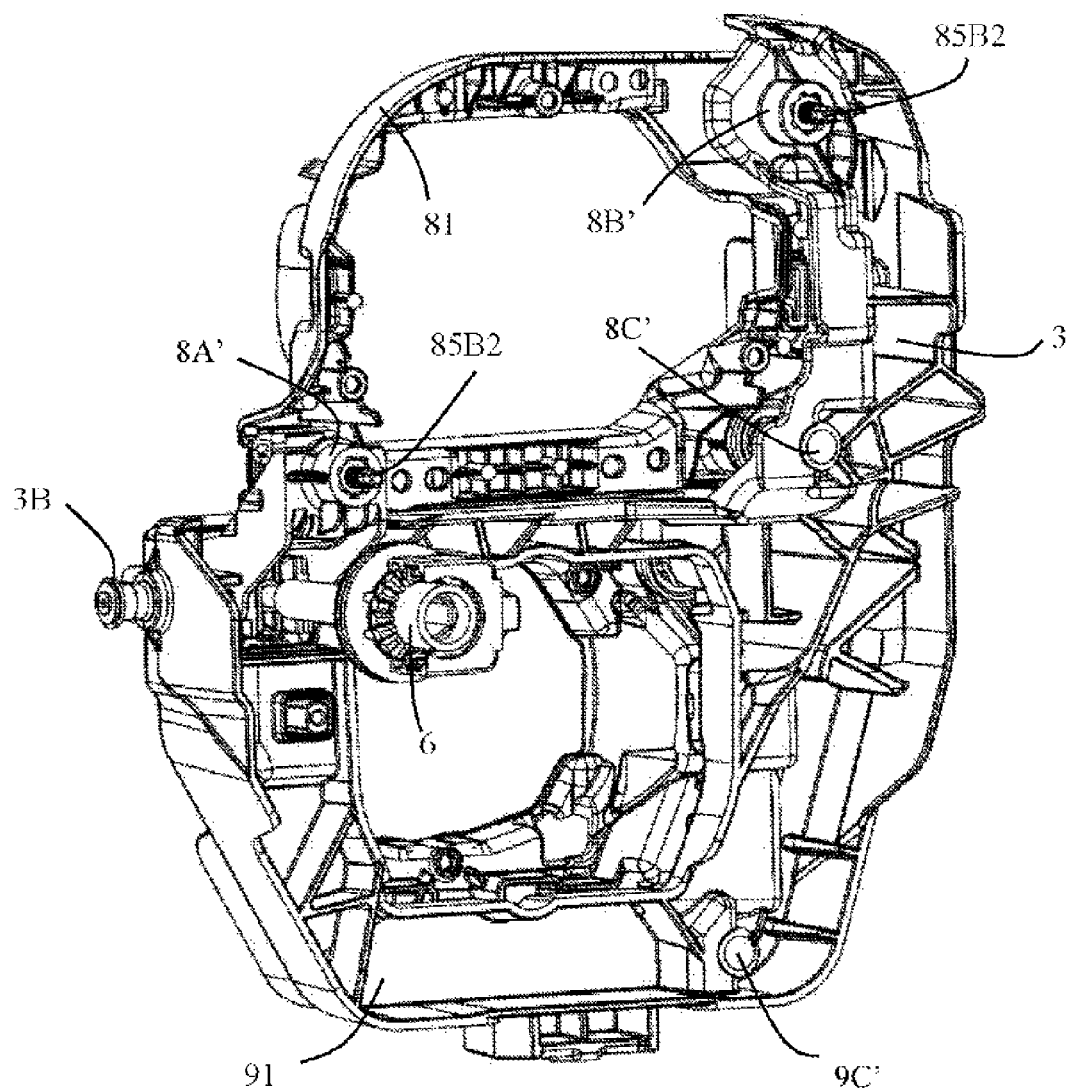
FIG. 4 is a schematic space back view of the light-emitting assembly in FIG. 2.

Therefore, compared with the connecting units for connecting the second light-emitting module 9 to the support, at least two of the connecting units for connecting the first light-emitting module 8 to the support can be finely adjusted, which further facilitates accurate adjustment. As can be seen particularly clearly from FIG. 4, among the joints 8A', 8B' and 8C' of the support for the connecting units of the first light-emitting module, the two 8A' and 8B' have a protruding adjusting section 85B2 of the associated connecting unit, and thus fine adjustment can be made at this adjusting section by means of a tool. It also can be seen that a joint 9C' of the support for the connecting unit of the second light-emitting module 9 is constructed as, for example, a blind hole.

Although the example in the figures shows that the first light-emitting module 8 has adjustable connecting units, this is only exemplary. That is, it is also possible that only the second light-emitting module 9 has adjustable connecting units; or they both have adjustable connecting units, in order to achieve the desired positional orientations relative to each other.

Figure 9:
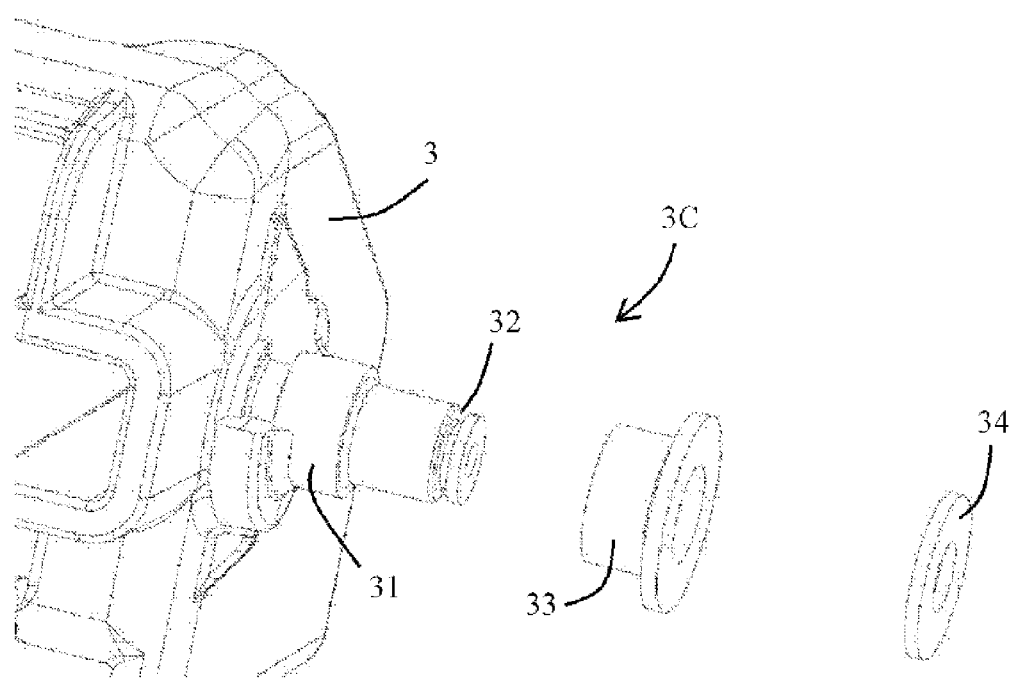
FIG. 9 is a schematic exploded view of the pivot part used for the support.

The pivot shaft 3C for the support 3 is shown in FIG. 9, and the pivot shaft 3B on the opposite side can be implemented in the same way. In this example, the pivot shaft is formed separately and attached to the support 3 by insert injection molding. The pivot shaft 3C comprises an insert 32, which has a better comprehensive performance than the plastic forming the support, in particular better mechanical strength, stiffness and wear resistance. Preferably, the insert 32 is made of a metal, for example stainless steel.

In order to further improve the ease of adjustment, a bearing 33, for example a roller bearing, may be mounted on the insert, the inner wall of which contacts both the outer circumference of the insert and the inner circumference of the accommodating portion for the insert, so that the support can rotate relative to the seat. In order to prevent the bearing from falling off, a notch 32 may be provided on the insert, and a baffle 34 is accommodated in the notch 32.

Alternatively, the pivot shaft 3C may be integrally formed with the support 3, but the pivot portion may have a better comprehensive performance than the support portion, in particular better mechanical strength, stiffness and wear resistance. For this, two-component injection molding may be used.

It should be noted that, although the example given in the figures shows that two light-emitting modules need to be adjusted together, more light-emitting modules may be provided, for which the second adjustment mechanism has a matching number of driven portions. Of course, each light-emitting module may also comprise multiple units, for example, multiple units arranged horizontally and adjusted together.

The light-emitting assembly may be a headlight of a vehicle. For this, one adjusting module may be a low beam module, and the other may be a high beam module; or the two modules may be combined to form a high beam module.

To adjust the light-emitting assembly, the first adjustment mechanism may be adjusted so that the light-emitting assembly rotates about the horizontal axis. The second adjustment mechanism may also be adjusted so that the light-emitting assembly rotates about vertical axes. When necessary, the second connecting unit may also be adjusted to pre-adjust the relative positional relationship between the light-emitting modules of the light-emitting assembly, and overall adjustment may be performed afterwards.

The present invention, instead of being limited to the above-described structure, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A light-emitting assembly for vehicles, having:
a seat;
a support, on which a light-emitting module is held;
a first adjustment mechanism, to perform a first adjustment of the light-emitting module;
a second adjustment mechanism, to perform a second adjustment of the light-emitting module;
wherein the support is pivotally connected to the seat so that the support can pivot about a horizontal axis under the action of the first adjustment mechanism, and
wherein the light-emitting module comprises a first light-emitting module and a second light-emitting module, which are vertically stacked.

2. A light-emitting assembly for vehicles, having:
a seat;
a support, on which a light-emitting module is held;
a first adjustment mechanism, to perform a first adjustment of the light-emitting module; and
a second adjustment mechanism, to perform a second adjustment of the light-emitting module;
wherein the support is pivotally connected to the seat so that the support can pivot about a horizontal axis under the action of the first adjustment mechanism, and
wherein the seat and the support are respectively provided with a first pivot shaft and an accommodating portion on one side, and a second pivot shaft and an accommodating portion on the opposite side, the first pivot shaft and the second pivot shaft are respectively accommodated in the accommodating portions, and the pivot axis corresponds to an axis of the first pivot shaft and the second pivot shaft or a central axis of the accommodating portions.

3. The light-emitting assembly as claimed in claim 2, wherein at least one accommodating portion is a slot open in the circumferential direction and is provided with a cover, wherein the inner contour of the accommodating portion and the cover matches the outer contour of the pivot shaft.

4. The light-emitting assembly as claimed in claim 3, wherein the light-emitting module comprises a first light-emitting module and a second light-emitting module, which are vertically stacked.

5. The light-emitting assembly as claimed in claim 4, wherein the second adjustment mechanism has points of action respectively acting on the first light-emitting module and the second light-emitting module, so as to perform the second adjustment about vertical axes separately.

6. The light-emitting assembly as claimed in claim 5, wherein the second adjustment mechanism has a sliding block that can be guided linearly in the support, and the points of action are formed on the sliding block, wherein at least one point of action can be adjusted linearly.

7. The light-emitting assembly as claimed in claim 5, wherein the first light-emitting module and/or the second light-emitting module are/is provided with carriers via which the light-emitting module(s) is(are) held on the support, and the points of action act on the carriers.

8. The light-emitting assembly as claimed in claim 2, wherein the first pivot shaft and the second pivot shaft are formed integrally with the support.

9. The light-emitting assembly as claimed in claim 2, wherein the first pivot shaft and the second pivot shaft are formed separately from the support, wherein the first pivot shaft and the second pivot shaft are provided on the support as inserts.

10. The light-emitting assembly as claimed in claim 2, wherein bearings are mounted on the first pivot shaft and the second pivot shaft.

11. The light-emitting assembly as claimed in claim 2, wherein the first adjustment mechanism and/or the second adjustment mechanism are/is (a) manual and/or electric adjustment mechanism(s).

12. The light-emitting assembly as claimed in claim 2, wherein the light-emitting module is a lighting module assembly.

13. The light-emitting assembly as claimed in claim 4, wherein the first light-emitting module has a first light function, the second light-emitting module has a second light function, or the first light-emitting module and the second light-emitting module realize a light function in coordination.

14. The light-emitting assembly as claimed in claim 2, wherein the seat is a housing of the light-emitting assembly or a component that is provided in the housing and fixed relative to the housing.

15. A method for adjusting a light-emitting assembly for vehicles, wherein the light-emitting assembly has:
a seat;
a support, on which a light-emitting module is held, wherein the light-emitting module comprises a first light-emitting module and a second light-emitting module, which are vertically stacked;
a first adjustment mechanism, to perform a first adjustment of the light-emitting module;
a second adjustment mechanism, to perform a second adjustment of the light-emitting module;
wherein the first adjustment mechanism is adjusted so that the support pivots about a horizontal axis.

16. The method as claimed in claim 15, wherein the second adjustment mechanism is adjusted so that the support rotates about vertical axes.

17. A vehicle comprising a light-emitting assembly according to claim 1.

18. The light-emitting assembly as claimed in claim 3, wherein the first pivot shaft and the second pivot shaft are formed integrally with the support.

19. The light-emitting assembly as claimed in claim 3, wherein the first pivot shaft and the second pivot shaft are formed separately from the support, wherein the first pivot shaft and the second pivot shaft are provided on the support as inserts.

20. The light-emitting assembly as claimed in claim 3, wherein bearings are mounted on the first pivot shaft and the second pivot shaft.

* * * * *